Aug. 9, 1949.  B. BANNISTER  2,478,227
TORQUE CONVERTER MECHANISM
Filed Sept. 13, 1945  10 Sheets-Sheet 1

Fig. 1.

Inventor.
Bryant Bannister
by J. Stanley Churchill.
att'y.

Aug. 9, 1949.  B. BANNISTER  2,478,227
TORQUE CONVERTER MECHANISM
Filed Sept. 13, 1945  10 Sheets-Sheet 2

Fig. 2.

Inventor.
Bryant Bannister
by J. Stanley Churchill
atty.

Aug. 9, 1949.  B. BANNISTER  2,478,227
TORQUE CONVERTER MECHANISM
Filed Sept. 13, 1945  10 Sheets-Sheet 7

Inventor.
Bryant Bannister
By J. Stanley Churchill
Atty.

Patented Aug. 9, 1949

2,478,227

UNITED STATES PATENT OFFICE 2,478,227

TORQUE CONVERTER MECHANISM

Bryant Bannister, Pittsburgh, Pa., assignor to H. H. Robertson Company, Pittsburgh, Pa., a corporation of Pennsylvania Application September 13, 1945, Serial No. 616,020

6 Claims. (Cl. 74—199)

This invention relates to torque converter mechanism.

The invention has for a general object to provide a novel and improved torque converter mechanism for variable speed transmission embodying frictional driving elements and which is characterized by the fact that at least one of the frictional elements comprises a yielding or deflecting member capable of being moved to vary the point of frictional contact between the elements whereby to change the speed ratio of the mechanism.

With this general object in view and such others as may hereinafter appear, the invention consists in the torque converter and in the various structures, arrangements and combinations of parts hereinafter described and particularly defined in the claims at the end of this specification.

In the drawings illustrating the preferred embodiment of the invention and selected modifications thereof.

In general, the present invention contemplates a variable speed torque converter mechanism of the friction drive type embodying friction discs and cooperating intermediate planetary friction rollers for the transmission of tangential driving forces, and is characterized by the provision of a yielding or deflecting member arranged to be deflected upon the application of pressure to change the point of tangential contact with relation to its cooperating friction element and thus effect a variation in the speed and relative torque of the driven element with relation to the driving element.

Figure 1:
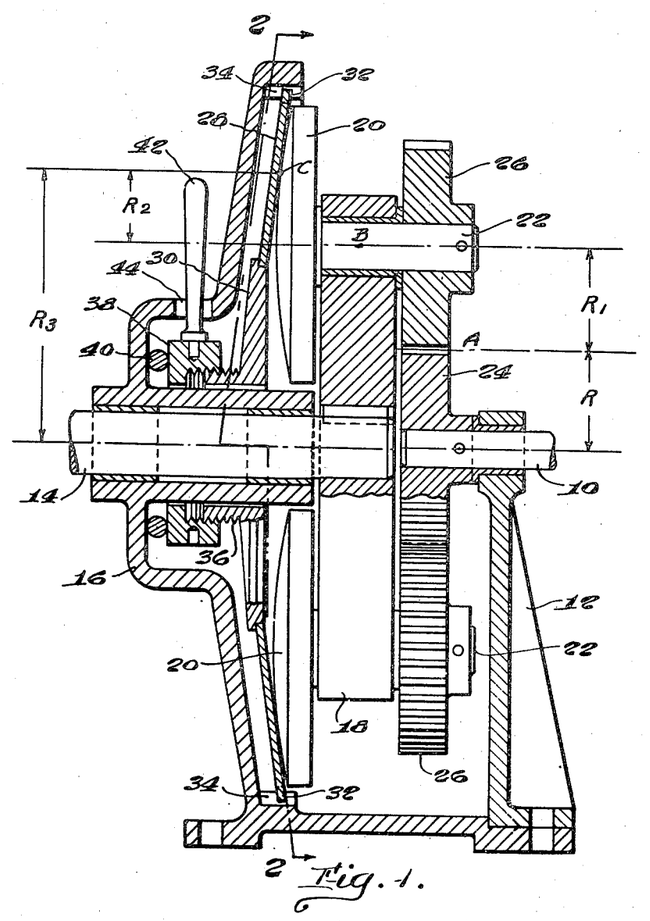
Fig. 1 is a cross sectional view of a torque converter embodying the present invention in a design having a single deflecting member in tangential driving engagement with a plurality of spherically faced rollers.
Figure 2:
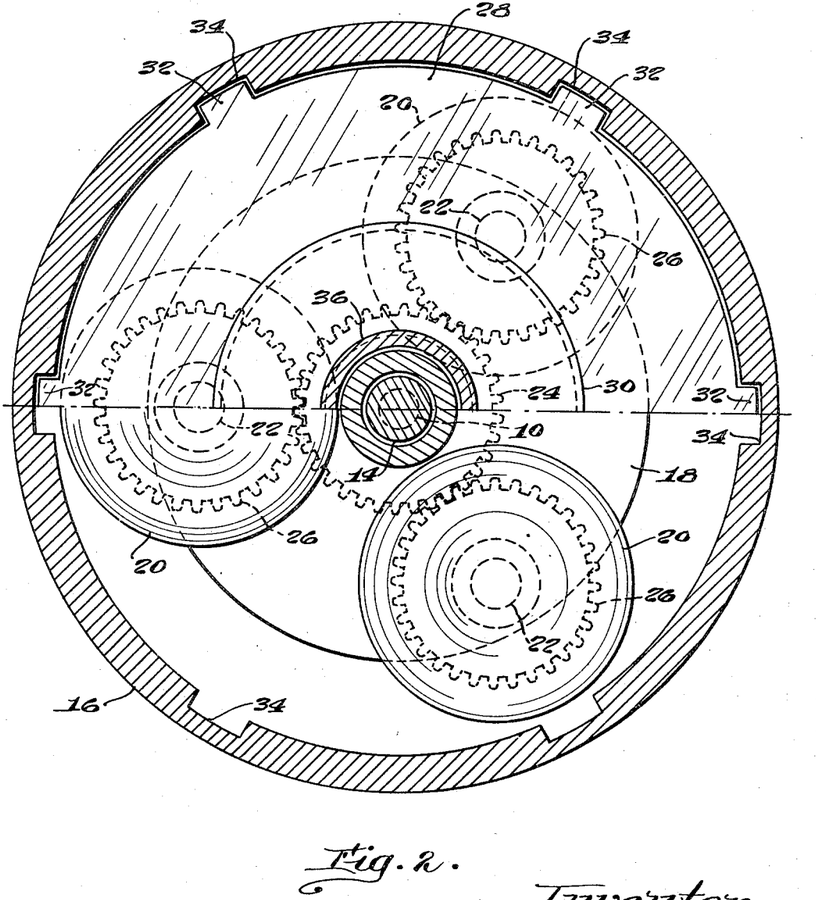
Fig. 2 is a cross section of Fig. 1 taken on the line 2—2 thereof.

Referring now to the drawings and particularly to Figs. 1 and 2, the invention as therein illustrated comprises a variable speed torque converter unit having a driving or input shaft 10 journaled in a bracket 12 and a driven or output shaft 14 supported in a casing 16 and in coaxial alignment with the driving shaft 10. A rotary carrier 18 keyed to the end of the driven shaft 14 is provided with a plurality of spherically faced planetary friction rollers 20 rotatably mounted therein on shafts 22 having their axes spaced from and parallel to the shafts 10 and 14. As herein shown, the rollers 20 are arranged to be rotated from the driving shaft 10 through planetary gear connections including a sun gear 24 fast on the shaft 10 which meshes with planetary gears 26 fast on each roller shaft 22. Cooperating with the friction rollers 20 and in tangential engagement therewith at a point beyond the radius from the center of shafts 10, 14 to the center of the roller shafts 22 is a conically shaped stationary deflecting disc 28 having its axis in alignment with said shafts 10 and 14. The deflecting disc 28 is secured at its inner periphery to a longitudinally adjustable member 30 and is free to flex at its outer periphery.

As illustrated in Figs. 1 and 2 the deflecting disc 28 is held from rotary movement by tongues 32 extending from the periphery thereof into grooves 34 provided in the casing 16. As herein shown the adjustable member 30 is provided with a threaded hub 36 for cooperation with an adjusting nut 38 which bears against a ball bearing indicated generally at 40 interposed between the nut and the housing 16 and the nut is provided with a detachable handle 42 extending through a slot 44 in the casing 16.

In the operation of the unit, the spherically faced planetary rollers 20 being rotated through the gear connections described frictionally engage the stationary conically shaped friction disc 28 to effect rotation of the carrier 18 and the driven shaft 14. Upon adjustment of the nut 38 to apply more or less pressure of the disc 28 against the cooperating rollers 20 the disc will flex and thus change the point of tangential contact of the disc with relation to the spherical face of the rollers, and, as a result, the speed ratio between the driving and driven shafts is changed.

As an example of the operation and characteristics of a typical torque converter embodying the above described structure and as illustrated in Fig. 1, R is the pitch circle radius of the sun gear 24; R1 is pitch circle radius of the planetary gears 26; R2 is the distance from the center of the roller shaft 22 to the point of tangential contact of the disc 28 with the planetary rollers 20; and R3 is the radius from the center of shafts 10, 14 to said point of tangential contact. Now, with an initial pressure between the deflecting disc and the rollers sufficiently great to develop the necessary tangential force, the point of contact will be adjacent to the outer edge of the spherically faced planetary rollers 20. Then, as the pressure is increased, the radius R2 decreases, and the point of contact will move toward the center of the rollers 20 resulting in variable speed ratios between input and output shafts 10, 14, as indicated in the table below.

| Radii | | | | Torque | | R. P. M. | |
|---|---|---|---|---|---|---|---|
| R | R1 | R2 | R3 | Input | Output | Input | Output |
| 1 | 1 | 1.5 | 3.5 | 1 | 3.33 | +1 | +.30 |
| 1 | 1 | 1.0 | 3.0 | 1 | 4.0 | +1 | +.25 |
| 1 | 1 | .5 | 2.5 | 1 | 6.0 | +1 | +.17 |

In the structure illustrated in Fig. 1, the input and output shafts always rotate in the same direction, and the output speed may be increased or decreased over the entire range of ratios by changing the gear ratios R and R1.

Figure 3:
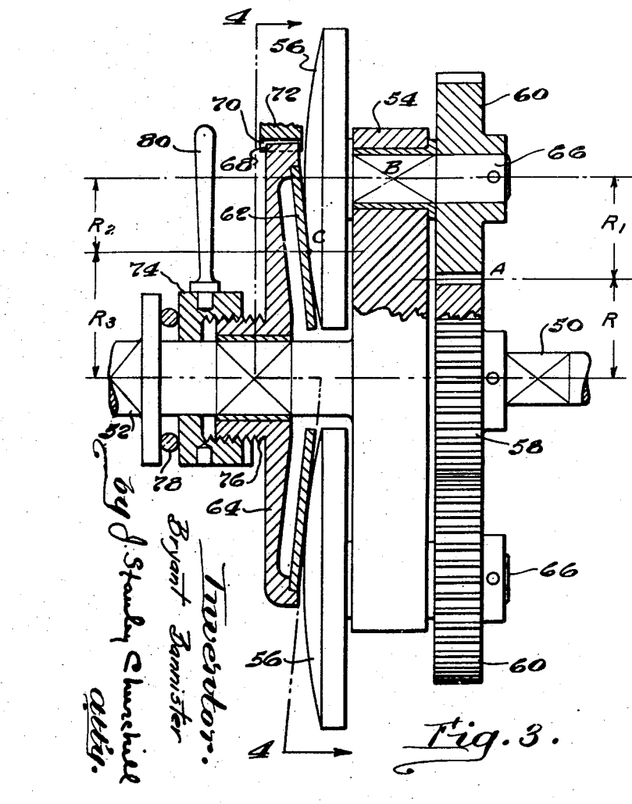
Fig. 3 is a cross sectional view similar to Fig. 1 showing the single deflecting member in engagement with a different portion of the spherically faced rollers.
Figure 4:
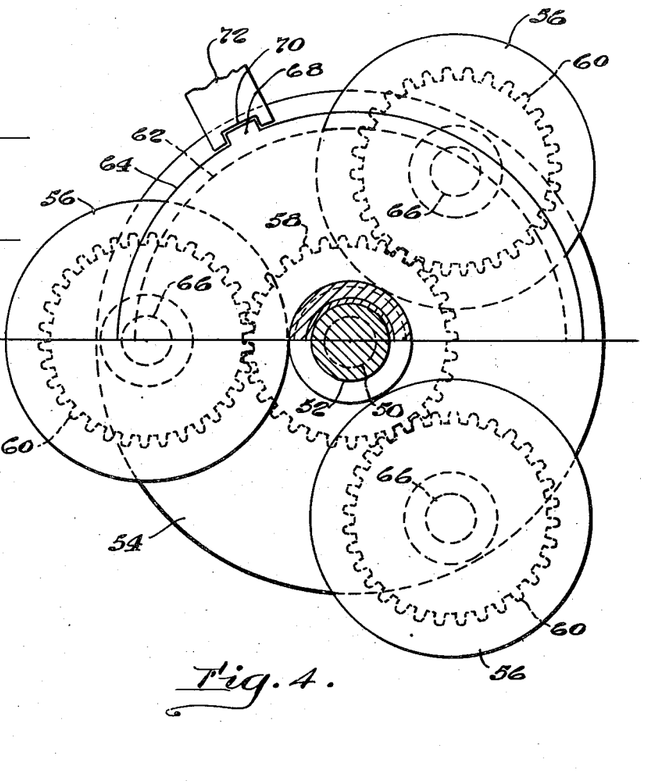
Fig. 4 is a cross sectional view taken on the line 4—4 of Fig. 3.

Referring now to Figs. 3 and 4 the embodiment of the present torque converter therein illustrated comprises a driving shaft 50 and a driven shaft 52 suitably supported in coaxial alignment with each other, and the driven shaft 52 is provided with a rotary carrier 54 in which a plurality of spherically faced planetary rollers 56 are rotatably mounted. The planetary rollers 56 are arranged to be rotated through planetary gearing 58, 60 in a manner similar to the embodiment illustrated in Fig. 1. In the embodiment shown in Fig. 3, a stationary deflecting disc 62, secured at its outer periphery and free to flex at its inner periphery, is supported in a longitudinally adjustable member 64 for tangential engagement with the planetary rollers 56 at a point within the radius from the center of the shafts 50, 52 to the center of the roller shafts 66.

As herein shown, the longitudinally adjustable member 64 is supported on the driven shaft 52 and is held from rotation by extensions 68 therefrom arranged to engage grooves 70 formed in a stationary portion 72 of the unit. An adjusting nut 74 which cooperates with the externally threaded hub 76 of the member 64 bears against a ball bearing indicated generally at 78 and is provided with a handle 80 for convenience in rotating the nut to effect an increase or a decrease in the pressure of the deflecting disc against the spherically faced surface of the planetary rollers. Thus, in operation, the planetary rollers 56 rotated through the planetary gear connections 58, 60 frictionally engage the stationary disc 62 to effect rotation of the driven shaft 52. The application of more or less pressure of the disc against the cooperating rollers will cause the disc to flex and thus change the tangential contact between the disc and the rollers and, as a result the speed ratio between the shafts 50 and 52 is changed.

As an example of the operation and characteristics of the modified embodiment of the invention, illustrated in Fig. 3, assuming the same basic proportions as in the example described for the embodiment illustrated in Fig. 1, it will be seen that with an initial pressure sufficient to develop the necessary tangential force, the point of contact will be adjacent to the inner periphery of the deflecting disc 62, and, as the pressure is increased the radius R2 decreases while the radius R3 increases, the point of contact moving toward the center of the planetary rollers 56 resulting in variable speed ratio between input and output shafts as indicated in the table below.

| Radii | | | | Torque | | R. P. M. | |
|---|---|---|---|---|---|---|---|
| R | R1 | R2 | R3 | Input | Output | Input | Output |
| 1 | 1 | 1.5 | .5 | 1 | .67 | 1 | 1.5 |
| 1 | 1 | 1.0 | 1.0 | 1 | 0 | 0 (Stall) | 0 (Stall) |
| 1 | 1 | .5 | 1.5 | 1 | −2 | | −.5 |

In the operation of the above described embodiment of the invention, the rotation of the driven shaft is in the same direction as the driving shaft when the radius R2 is greater than the radius R1, and, when radius R2 is equal to radius R1, the driving shaft will stall and the driven shaft may "free wheel." When radius R2 is less than radius R1, rotation of the driven shaft is opposite to that of the driving shaft.

Figure 5:
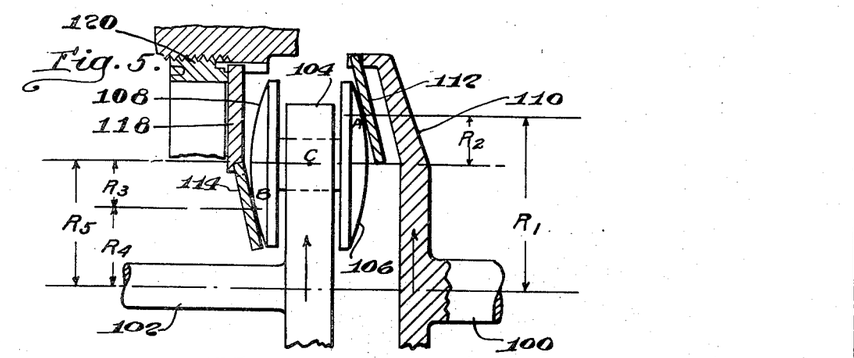
Figs. 5, 6 and 7 are partial cross sectional views of the present torque converter embodying two deflecting members.
Figure 6:
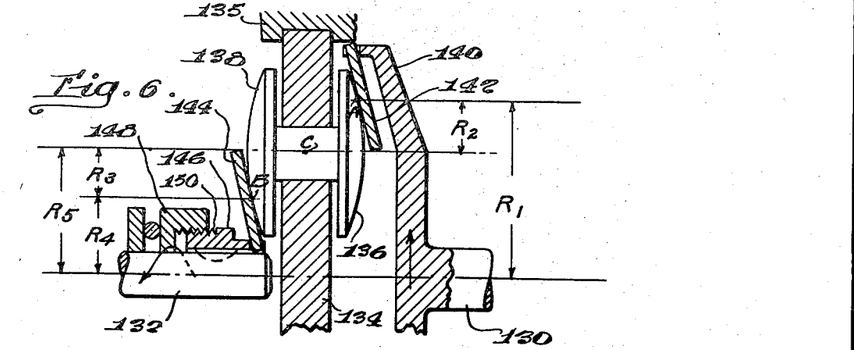
Figure 7:
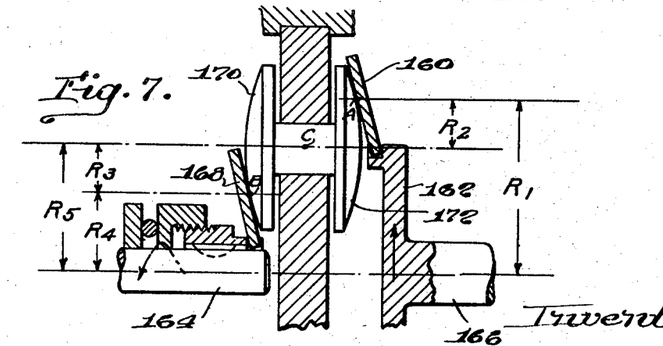

Figs. 5, 6 and 7 diagrammatically illustrate different modifications of the present invention as embodying two conically shaped deflecting discs for cooperation with opposing spherical faces of a roller supported therebetween. The mechanism illustrated in Fig. 5 comprises a driving shaft 100 and a driven shaft 102 in coaxial alignment therewith, the driven shaft being provided with a rotary carrier 104 fast thereon or formed integrally therewith. A plurality of rollers having opposing spherically faced surfaces 106, 108 are rotatably mounted in the carrier on axes spaced from and parallel to the shafts 100, 102. The driving shaft 100 is provided with a flanged portion 110 fixed thereto and arranged to support a conically shaped deflecting disc 112 for tangential driving engagement with the spherically faced surface 106 of the rollers at a point beyond the radius R5 from the center of the shafts 100, 102 to the center of the rollers. A second conically shaped deflecting disc 114 is supported by a nonrotatable member 118 of the unit for tangential engagement with the opposing spherically faced surface 108 of the rollers at a point within the radius R5 from the center of the shafts 100, 102 to the center of the rollers.

Both deflecting discs 112 and 114 are fixed at their outer peripheries and are free to flex at their inner peripheries, and, provision is made for applying lateral pressure to urge the discs against their cooperating rollers. As herein shown, element 118 is axially movable and is arranged to bear against the outer periphery of the stationary disc 114 to effect flexing thereof and the pressure thus applied is communicated to the deflecting disc 112 through the cooperating rollers in the carrier 104. The member 118 is arranged to cooperate with an adjusting ring 120 for increasing or decreasing the pressure applied.

With this construction it will be apparent that the frictional engagement of the driver deflecting disc 112 with one face 106 of the rollers will effect rotation of the latter, and, the frictional engagement of the opposing face 108 of the rollers with the stationary disc 114 will effect rotation of the carrier and the output shaft 102. Thus, in operation, with an initial pressure applied at the stationary deflecting disc 114 sufficiently large to develop the necessary tangential forces, the point of contact between the driver deflecting disc 112 and the surface 106 of the rollers will be near the center of the latter, and, the point of contact between the stationary disc 114 and the opposing face 108 of the roller will be near the outer edge of the latter, this position representing the minimum value of radius R2 and the maximum value of radius R3. As the pressure is increased radius R2 will be increased and radius R3 will be decreased, resulting in variable speed ratios between input and output shafts, as indicated in the table below for a typical example.

132, the disc 144 being free to flex at its outer periphery and in tangential engagement with the opposing spherically faced surface 138 of the rollers at a point within the radius R5 from the center of the shafts 130, 132 to the center of the rollers. An adjusting nut 148 cooperating with an externally threaded portion 150 of the axially movable member 146 is arranged to provide lateral pressure and thus effect flexing of the deflecting discs 142, 144.

With this construction it will be seen that the frictional engagement of the driver deflecting disc 142 with one face 136 of the intermediate rollers will effect rotation of the latter, and, the frictional engagement of the opposing face 138 of the rollers with the deflecting disc 144 will effect rotation of the driven shaft. Thus, in operation, with an initial pressure applied at the inner edge of the driven deflective disc 144 sufficient to develop the necessary tangential forces, the point of contact between the driven disc 144 and the surface 138 of the spherically faced rollers will be near the center of the latter, and, the point of contact between the driver deflecting disc 142 and the opposing face 136 of the roller

| Radii | | | | | Torque | | | Tan. Force | | | Press. Req'd. | | R. P. M. | | |
|---|---|---|---|---|---|---|---|---|---|---|---|---|---|---|---|
| R1 | R2 | R3 | R4 | R5 | Input | Output | Plan | A | B | C | A | B | Input | Output | Plan |
| 3.25 | .25 | 1 | 2 | 3 | 1 | 1.15 | .077 | .307 | .077 | .384 | 2.67 | .51 | 1 | .87 | 2.6 |
| 3.5 | .5 | .5 | 2.5 | 3 | 1 | 1.71 | .143 | .285 | .285 | .57 | 1.9 | 1.9 | 1 | .584 | 3.5 |
| 4.0 | 1.0 | .25 | 2.75 | 3 | 1 | 3.75 | .25 | .25 | 1.0 | 1.25 | 1.66 | 6.7 | 1 | .27 | 3.2 |
| 3.25 | .25 | 2 | 1 | 3 | 1 | 1.04 | .077 | .307 | .038 | .345 | 2.04 | .25 | 1 | .96 | 1.4 |
| 5.0 | 2.0 | .25 | 2.75 | 3 | 1 | 5.4 | .40 | .20 | 1.6 | 1.8 | 1.33 | 10.6 | 1 | .186 | 2.2 |

In the above described embodiment, the driven member rotates in the same direction as the driver, and, the driven member must always rotate at a slower speed than the driving member. A one to one ratio is impossible but may be approached if radius R2 is small and radius R3 large compared to radius R5.

The mechanism illustrated in Fig. 6 discloses an embodiment in which the driven element rotates in an opposite direction to the driving element and at a higher speed and comprises a driving shaft 130 and a driven shaft 132 in coaxial alignment. A carrier 134 non-rotatably supported between the shafts in a portion 135 of the casing is provided with a plurality of rollers having opposing spherically faced surfaces 136, 138 which are rotatably mounted therein on axes spaced from and parallel to the shafts 130, 132. The driving shaft 130 is provided with a flanged portion 140 fixed thereto and arranged to support a conically shaped deflecting disc 142 for tangential driving engagement with the spherically faced surface 136 of the rollers at a point beyond the radius R5 from the center of the shafts 130, 132 to the center of the rollers, the deflecting disc 142 being secured at its outer periphery and free to flex at its inner periphery. A second conically shaped deflecting disc 144 is supported at its inner periphery by an axially adjustable member 146 keyed to the driven shaft will also be near the center of the latter, these positions representing the minimum values of radii R2 and R3. As the pressure is increased the points of contact will move outward from the center of the rollers effecting an increase in the radii R2 and R3 and resulting in variable speed ratios as tabulated below for a typical example.

| Radii | | | | | Torque | | | Tan. Force | | | Press. Req'd. | | R. P. M. | | |
|---|---|---|---|---|---|---|---|---|---|---|---|---|---|---|---|
| R1 | R2 | R3 | R4 | R5 | Input | Output | Intermed. | A | B | C | A | B | Input | Output | Intermed. |
| 3.25 | .25 | .25 | 2.75 | 3 | 1 | .84 | .08 | .307 | .31 | .61 | 2.05 | 2.05 | 1 | 1.2 | 13 |
| 3.5 | .50 | .50 | 2.5 | 3 | 1 | .72 | .14 | .286 | .29 | .57 | 1.9 | 1.9 | 1 | 1.4 | 7 |
| 3.75 | .75 | .75 | 2.25 | 3 | 1 | .60 | .20 | .267 | .27 | .53 | 1.78 | 1.78 | 1 | 1.67 | 5 |
| 4.0 | 1.0 | 1.0 | 2.0 | 3 | 1 | .50 | .25 | .25 | .25 | .50 | 1.66 | 1.66 | 1 | 2.0 | 4 |
| 4.5 | 1.5 | 1.5 | 1.5 | 3 | 1 | .33 | .33 | .22 | .22 | .44 | 1.48 | 1.48 | 1 | 3.0 | 3 |
| 5.0 | 2.0 | 2.0 | 1.0 | 3 | 1 | .20 | .40 | .20 | .20 | .40 | 1.33 | 1.33 | 1 | 5.0 | 2.5 |

In the above described embodiment, Fig. 6, a one to one ratio is impossible but may be approached if radii R2 and R3 are small compared to radius R5.

The modification illustrated in Fig. 7 is similar to that shown in Fig. 5 in all respects except that the driver deflecting disc 160 is secured at its inner periphery to the flanged portion 162 and is free to flex at its outer periphery. In this embodiment the driven member 164 also rotates in the opposite direction to the driver 166 but the speed of the driven member 164 may be varied from a fraction of the driver speed, through a one to one ratio, to a considerable multiple of the driver speed.

Figure 8:
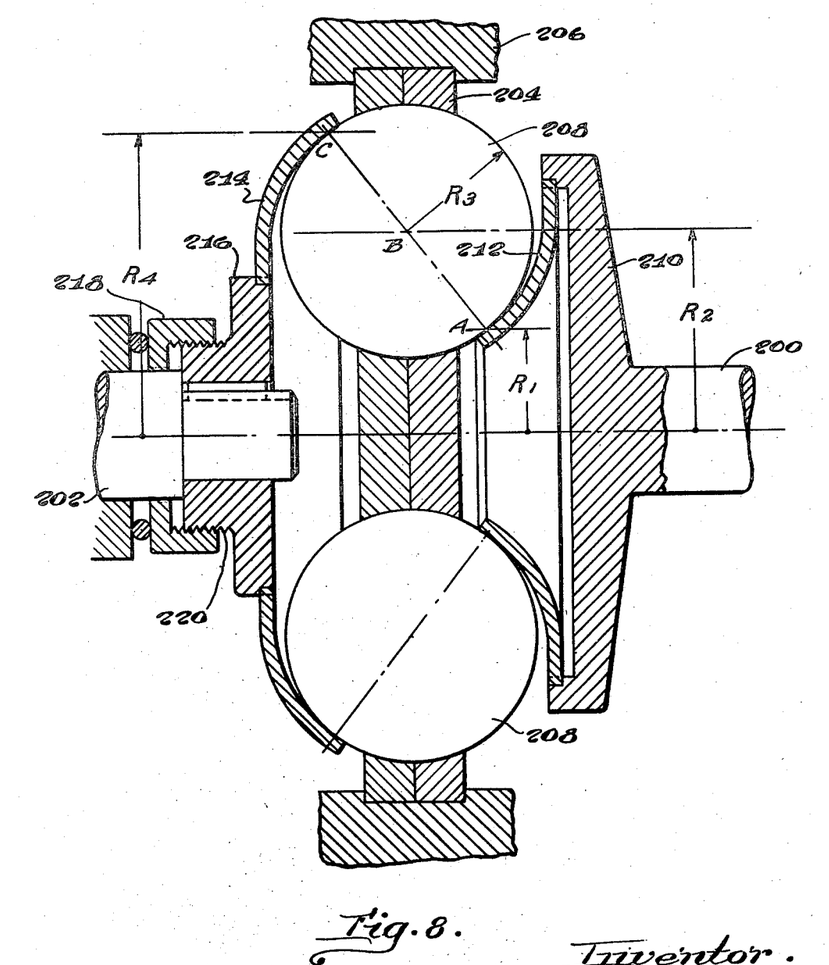
Figs. 8 and 9 are cross sectional views of the present invention embodying a plurality of ball rollers and cooperating curved deflecting discs.

In the operation of the embodiment disclosed in Fig. 7, with an initial pressure applied at the inner edge of the driven deflecting disc 168 sufficiently large to develop the necessary tangential forces, the point of contact between the driven deflecting disc 168 and the surface 170 of the spherically faced roller will be near the center of the latter, the radius R3 having its minimum value, and, the point of contact between the driver deflecting disc 160 and the opposing face 172 of the spherically faced roller will be at the outer edge of the latter, the radius R2 having its maximum value. As additional pressure is applied radius R3 will increase while radius R2 will decrease, resulting in variable speed ratios in accordance with the table below.

variable speed ratios between the input and output shafts as indicated in the table below.

| Radii | | | | Torque | | Tan. Force | | | R. P. M. | | |
|---|---|---|---|---|---|---|---|---|---|---|---|
| R1 | R2 | R3 | R4 | Input | Output | A | B | C | Input | Output | Ball |
| 1 | 2 | 1.25 | 3 | 1 | 3 | 1 | 2 | 1 | 1 | .33 | .80 |
| 1.5 | 2 | 1.25 | 2.5 | 1 | 1.67 | .67 | 1.33 | .67 | 1 | .60 | 1.2 |
| 2 | 2 | 1.25 | 2 | 1 | 1.0 | .5 | 1.0 | .5 | 1 | 1.0 | 1.6 |

In the above illustrated structure, the driven member 202 rotates in the opposite direction to the driving member 200, and, the speed of the driven member may be varied from a fraction of the driver speed up to a one to one ratio. Ratios larger than five to one involve disproportionately large balls and are therefore not feasible.

| Radii | | | | | Torque | | | Tan. Force | | | Press. Req'd. | | R. P. M. | | |
|---|---|---|---|---|---|---|---|---|---|---|---|---|---|---|---|
| R1 | R2 | R3 | R4 | R5 | Input | Output | Intermed. | A | B | C | A | B | Input | Output | Intermed. |
| 5.0 | 2.0 | .25 | 2.75 | 3 | 1 | 4.4 | .40 | .20 | 1.6 | 1.8 | 1.33 | 10.7 | 1 | .23 | 2.5 |
| 4.0 | 1.0 | .6 | 2.4 | 3 | 1 | 1 | .25 | .25 | .42 | .53 | 1.66 | 2.78 | 1 | 1.0 | 4.0 |
| 3.75 | .75 | 1.0 | 2.0 | 3 | 1 | .40 | .20 | .27 | .20 | .47 | 1.78 | 1.33 | 1 | 2.5 | 5.0 |
| 3.5 | .5 | 1.5 | 1.5 | 3 | 1 | .14 | .14 | .29 | .10 | .38 | 1.9 | .63 | 1 | 7.1 | 7.0 |
| 3.25 | .25 | 2 | 1.0 | 3 | 1 | .04 | .08 | .31 | .04 | .35 | 2.05 | .25 | 1 | 26.3 | 13.0 |

Referring now to Fig. 8, the embodiment of the friction drive torque converter therein illustrated employs a pair of deflecting discs of curved contour for cooperation with metal balls supported therebetween, and comprises a driving shaft 200 and a driven shaft 202 suitably supported in coaxial alignment with each other. An intermediate ball carrier 204 non-rotatably mounted in the unit housing 206 is provided with a plurality of metal balls 208 rotatably mounted therein at points equidistantly spaced from the center of the shafts 200, 202. The driving shaft 200 is provided with a flanged portion 210 fixed thereto and arranged to support a deflecting disc 212 having a curved contour for tangential engagement with one side of each metal ball 208, the disc 212 being secured at its outer periphery and free to flex at its inner periphery. A second deflecting disc 214 also having a curved contour is supported at its inner periphery by an axially movable member 216 keyed to the driven shaft 202, the second disc being free to flex at its outer periphery and in tangential engagement with the opposite sides of each metal ball. The radius of curvature of each deflecting disc may and preferably will be slightly larger than the ball radius.

Lateral pressure may be applied to either end to effect driving engagement of the discs with their cooperative ball rollers, and, as herein shown, an adjusting nut 218 cooperating with an externally threaded portion 220 of the axially movable member 216 may be provided for this purpose.

Figure 9:
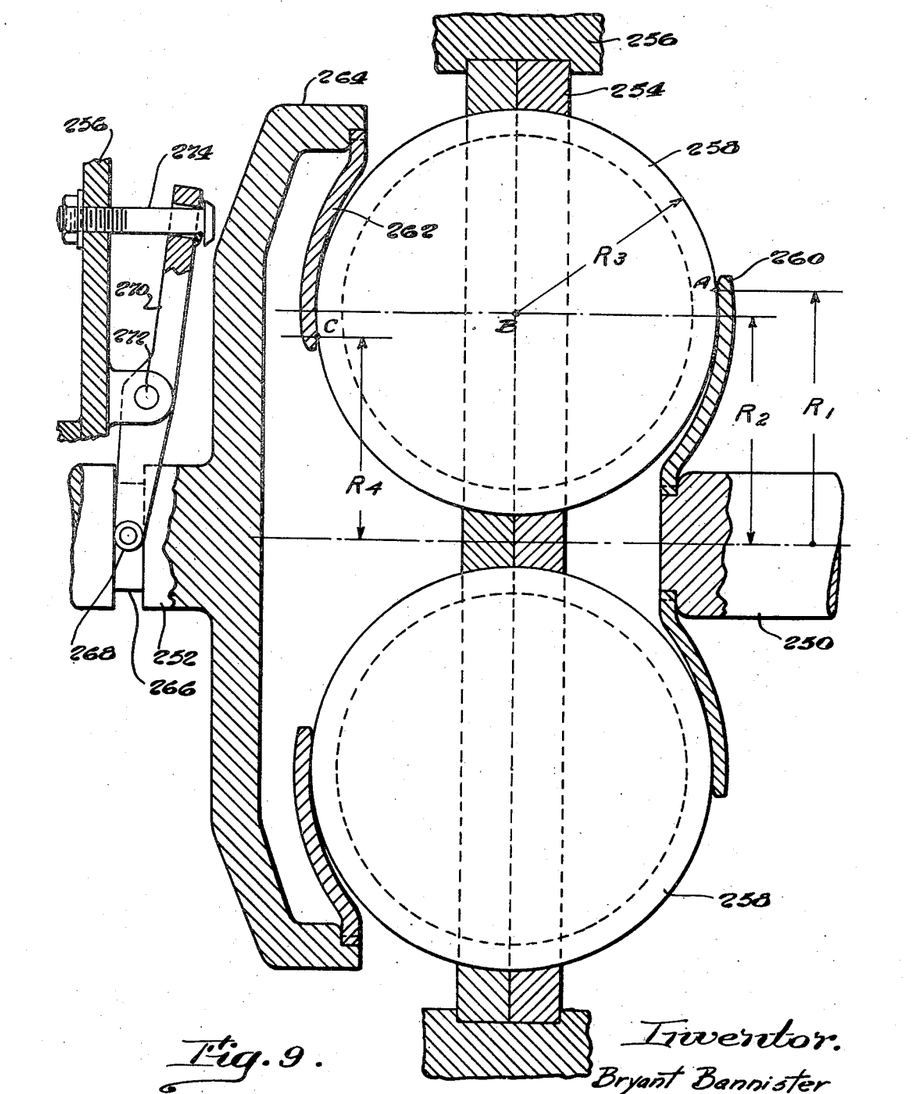

With this construction it will be apparent that rotation of the driver deflecting disc 212 in frictional contact with one side of each metal ball imparts a rotational motion to the balls which in turn imparts a reverse rotational motion to the driven deflecting disc 214 and the shaft to which it is keyed. Thus, in operation, with an initial pressure sufficient to develop the necessary tangential forces, the radius R1 of ball contact on the driver deflecting disc 212 will be at a minimum, and, the radius R4 of ball contact on the driven deflecting disc 214 will be at a maximum. As pressure is increased the radius R1 will increase while radius R4 will decrease resulting in Another embodiment of the invention employing a pair of deflecting discs of curved contour cooperating with intermediately supported metal balls is illustrated in Fig. 9. As therein shown, this modified form comprises a driving shaft 250 and a coaxial driven shaft 252 having a ball carrier 254 non-rotatably supported therebetween in the unit housing 256. A plurality of metal balls 258 are rotatably supported in the carrier 254 at points equidistantly spaced from the center of the shafts 250, 252. The driving shaft 250 is provided with a deflecting disc 260 fast thereon of curved contour fixed at its inner periphery and free to flex at its outer periphery for tangential engagement with one side of each metal ball 258 at points ranging from slightly beyond the radius R2, from the center of the shafts to the center of the metal balls, to a point within said radius subtending at an angle of approximately 45° with the ball spacer or carrier 254.

A second deflecting disc 262 also having a curved contour, is supported at its outer periphery and free to flex at its inner periphery by a flanged portion 264 fast on or formed integrally with the driven shaft 252. The second deflecting disc 262 is arranged to engage the opposite side of each metal ball 258 at points ranging from slightly within the radius R2, to a point beyond said radius subtending at an angle of approximately 45° with the ball spacer 254. The radius of curvature of each deflecting disc 260, 262 may and preferably will be slightly larger than the ball radius. Lateral pressure may be applied to either end of the unit to effect driving engagement of the discs with their cooperating ball rollers 258 and, as herein shown, the driven shaft 252 may be provided with a grooved portion 266 arranged to receive rollers 268 carried in a yoked arm 270 pivotally mounted at 272 in a portion of the housing 256. The upper end of the yoked arm 270 is engaged by an adjusting bolt 274 secured in the housing for moving the shaft 252 axially and thus increasing or decreasing the pressure applied.

With this construction it will be apparent that rotation of the driver deflecting disc 260 in frictional contact with one side of each metal ball 258 imparts a rotational motion to the ball rollers which in turn imparts a reverse rotational motion to the driven deflecting disc 262 and shaft 252. Thus, in operation, with an initial pressure sufficient to develop the necessary tangential forces, the radius R1 of ball contact with the driver deflecting disc 260 will be at a maximum, and the radius R4 of ball contact with the driven deflecting disc 262 will be at a minimum. As pressure is increased the radius R1 will decrease while the radius R4 will increase, resulting in variable speed ratios as tabulated below for a typical example.

| Radii | | | | Torque | | Tan. Force | | | R. P. M. | | |
|---|---|---|---|---|---|---|---|---|---|---|---|
| R1 | R2 | R3 | R4 | Input | Output | A | B | C | Input | Output | Ball |
| 5¾ | 5¼ | 4 | 4¾ | 1 | .83 | .17 | .34 | .17 | 1 | 1.21 | 1.44 |
| 5¼ | 5¼ | 4 | 5¼ | 1 | 1 | .19 | .38 | .19 | 1 | 1 | 1.31 |
| 3¾ | 5¼ | 4 | 6¾ | 1 | 1.8 | .27 | .54 | .27 | 1 | .56 | .94 |
| 2¾ | 5¼ | 4 | 8¼ | 1 | 3.66 | .44 | .88 | .44 | 1 | .27 | .56 |

In the above described structure, the driven member 252 rotates in the opposite direction to the driving member and the speed of the driven member may be varied from slightly greater than the driver speed to ¼ or ⅕ of driver speed depending on design. Ratios larger than 5 to 1 involve disproportionately large balls and are not feasible.

Figure 10:
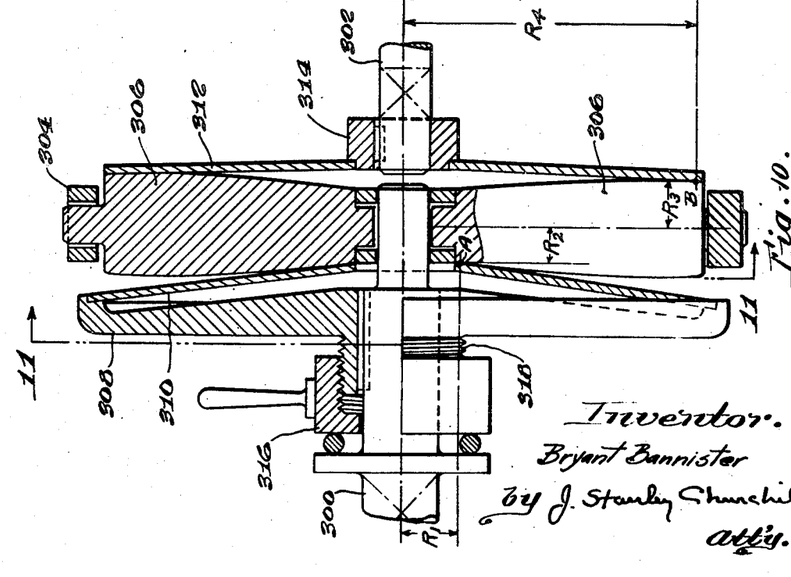
Fig. 10 is a cross sectional view of a torque converter embodying a pair of deflecting discs in cooperation with a plurality of tapered spherically faced rollers.
Figure 11:
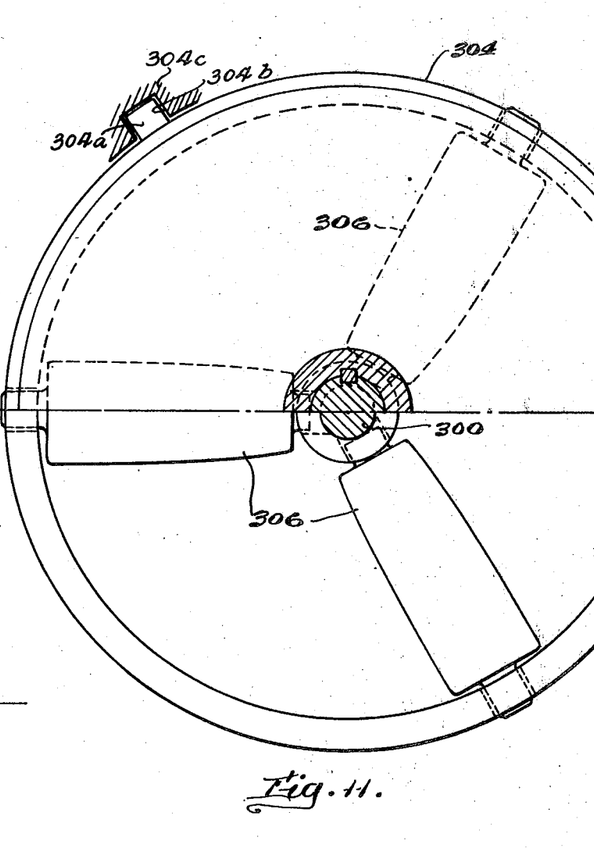
Fig. 11 is a cross section taken on the line 11—11 of Fig. 10.

Referring now to Figs. 10 and 11, the modification of the invention therein illustrated embodies a pair of conically shaped deflecting discs co-operating with intermediate rollers rotatable on axes radially arranged with respect to the center of coaxial input and output shafts and in which a large range of ratios is possible. As therein shown, the modified mechanism comprises a driving shaft 300 suitably supported in coaxial alignment with a driven shaft 302. A roller carrier 304 non-rotatably supported intermediate the shafts 300, 302 but free to move axially with relation thereto is provided with a plurality of rollers 306 having their axes radially arranged with respect to the shafts. The roller carrier 304 may be retained against rotary movement about the axis of shaft 300 by means of a lug 304a rigidly carried thereby and extending into a longitudinal groove 304b in a stationary frame member or casing portion 304c, as shown in Fig. 11. Such an arrangement would permit the carrier 304 to move longitudinally of the shaft 300, as described above, but would prevent its rotation about the axis of the shaft. As herein shown, the rollers 306 are tapered with a convex curvature with the small ends thereof adjacent to the center of the shafts 300, 302.

The driving shaft 300 is provided with a flanged member 308 keyed thereto but free to move axially and which is arranged to support a conically shaped deflecting disc 310 for tangential engagement with one side of each tapered roller 306, the disc 310 being secured at its outer periphery and free to flex at its inner periphery. A second conically shaped deflecting disc 312 is supported at its inner periphery in a collar 314 keyed to the driven shaft 302, the second disc 302 being free to flex at its outer periphery and in tangential engagement with the opposite side of each tapered roller 306.

The driver deflecting disc 310 initially engages the smaller ends of the tapered rollers 306 and the driven deflecting disc 312 initially engages the larger ends thereof. Lateral pressure may be applied at either end to effect frictional driving engagement of the discs 310, 312 with their co-operating radially arranged rollers 306, and as herein shown, an adjusting nut 316 cooperating with an externally threaded portion 318 of the flanged member 308 may be provided for this purpose.

With this construction it will be seen that rotation of the driver deflecting disc 310 in frictional contact with one side of each tapered roller 306 imparts a rotational motion thereto which in turn impart reverse rotational motion to the driven deflecting disc 312 and the shaft 302 to which it is keyed. Thus, in operation, with an initial pressure sufficient to develop the necessary tangential forces, the point of tangential contact of the discs with the rollers will be, as above described, with the radius R1 at its minimum value, and the radius R4 at its maximum value at which time minimum output speed will be obtained. As the pressure is increased by adjustment of the nut 316, radius R1 will increase while radius R4 will decrease. At the same time radius R2 will increase while radius R3 will decrease until the points of tangential contact reach the opposite ends from the points of initial engagement with the rollers 306, at which position maximum output speeds will be obtained.

In the above described embodiment of the invention, the driven shaft 302 rotates in the opposite direction to the driving shaft and a large range of ratios from a small fraction of the input speed, through a ratio of one to one, to a considerable multiple of the input speed is possible, as indicated in the table below, for an example. As an optional arrangement the driver and driven members may be reversed to provide a speed up condition.

| Radii | | | | Torque | | Tan. Force | | R. P. M. | | |
|---|---|---|---|---|---|---|---|---|---|---|
| R1 | R2 | R3 | R4 | Input | Output | A | B | Input | Output | Roller |
| .5 | .375 | .50 | 3.0 | 1 | 4.5 | 2.0 | 1.5 | 1 | .22 | 1.33 |
| 1.125 | .40 | .48 | 2.375 | 1 | 1.76 | .89 | .74 | 1 | .57 | 2.8 |
| 1.75 | .46 | .46 | 1.75 | 1 | 1.0 | .57 | .57 | 1 | 1.0 | 3.8 |
| 2.375 | .48 | .40 | 1.125 | 1 | .57 | .42 | .50 | 1 | 1.76 | 4.95 |
| 3.0 | .50 | .375 | .50 | 1 | .22 | .33 | .44 | 1 | 4.5 | 6.0 |

Figure 12:
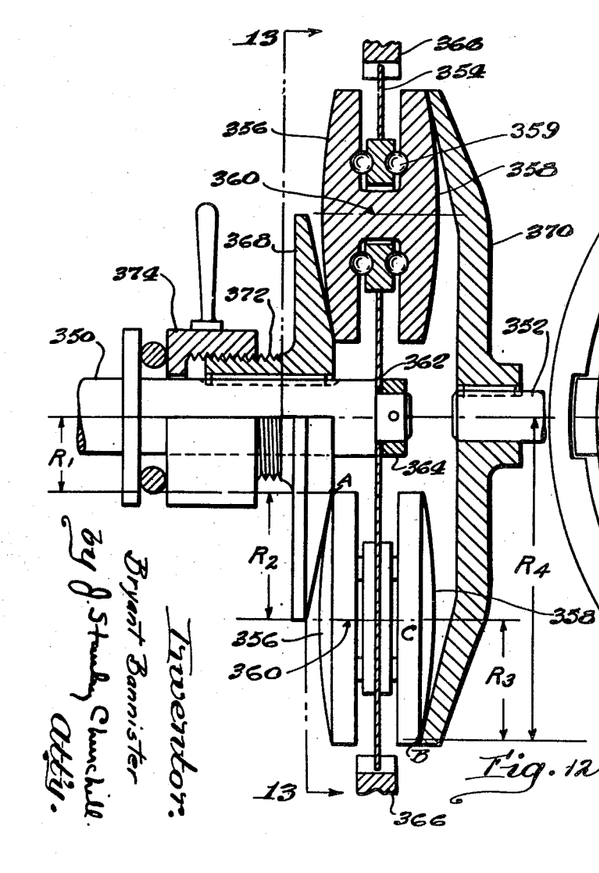
Fig. 12 is a cross sectional view of an embodiment of the invention having rigid friction discs cooperating with barrel shaped rollers mounted in a deflecting disc.
Figure 13:
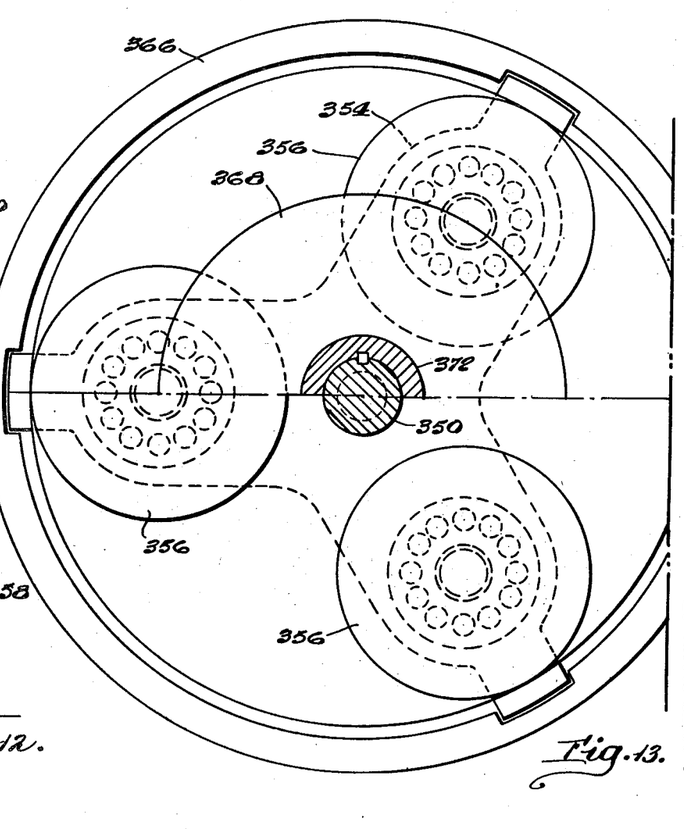
Fig. 13 is a cross section taken on the line 13—13 of Fig. 12.

Figs. 12 and 13 illustrate an embodiment of the invention in which a non-rotatable deflecting carrier intermediate the input and output shafts supports a plurality of spherically faced rollers for cooperation with opposing conically shaped rigid discs and includes a driving shaft 350 and a coaxial driven shaft 352. An intermediate non-rotatable flexible deflecting carrier 354 is arranged to support a plurality of rollers having opposed spherically faced surfaces 356, 358 which are rotatable in suitable bearings 359 on axes 360 spaced from and parallel to the shafts 350, 352. As herein shown, the flexible carrier 354 is held from axial movement but not necessarily at its inner periphery by being interposed between a shoulder 362 on the driving shaft 350 and a collar 364 fast on the shaft, and, is held from rotation but free to move axially by engagement with a stationary ring 366 supported in the unit housing.

The driving shaft 350 is provided with a conically faced rigid disc 368 keyed thereto but movable axially thereon for tangential driving engagement with the spherically faced surface 356 of the rollers at a point within the radius from the center of the shafts 350, 352 to the center of the roller axes 360. A second conically faced rigid disc 370 keyed to the driven shaft 352 is shaped for tangential engagement with the opposing spherically faced surface 358 of the rollers at a point beyond the radius from the center of the shafts 350, 352 to the center of the roller axes. Axial movement of the rigid disc 368 to vary the pressure applied to the driving elements may be effected by an adjusting nut 374 cooperating with a threaded portion 372 of the disc 368.

From the above description it will be seen that the frictional engagement of the rigid driver disc 368 with one face 356 of the spherically faced rollers will effect rotation of the latter, and, the frictional engagement of the opposing face 358 of the rollers with the rigid disc 370 will effect a reverse rotation of the driven shaft 352. Thus, in operation, with an initial applied pressure sufficient to develop the necessary tangential forces the initial point of tangential contact represented by the radius R1 will be at its minimum value and the radii R2, R3 and R4 will be at their maximum value. As the pressure is increased the radius R1 will increase while radii R2, R3 and R4 will decrease. The initial speed reduction of the driven shaft will be at its maximum, approaching a one to one ratio as the pressure is increased. The range of ratios obtainable in the above described structure is limited to between five or six to one and approximately one and one quarter to one. An absolute one to one ratio cannot be obtained since the mechanism would stall as soon as radius R1 is equal to radius R4.

Figure 14:
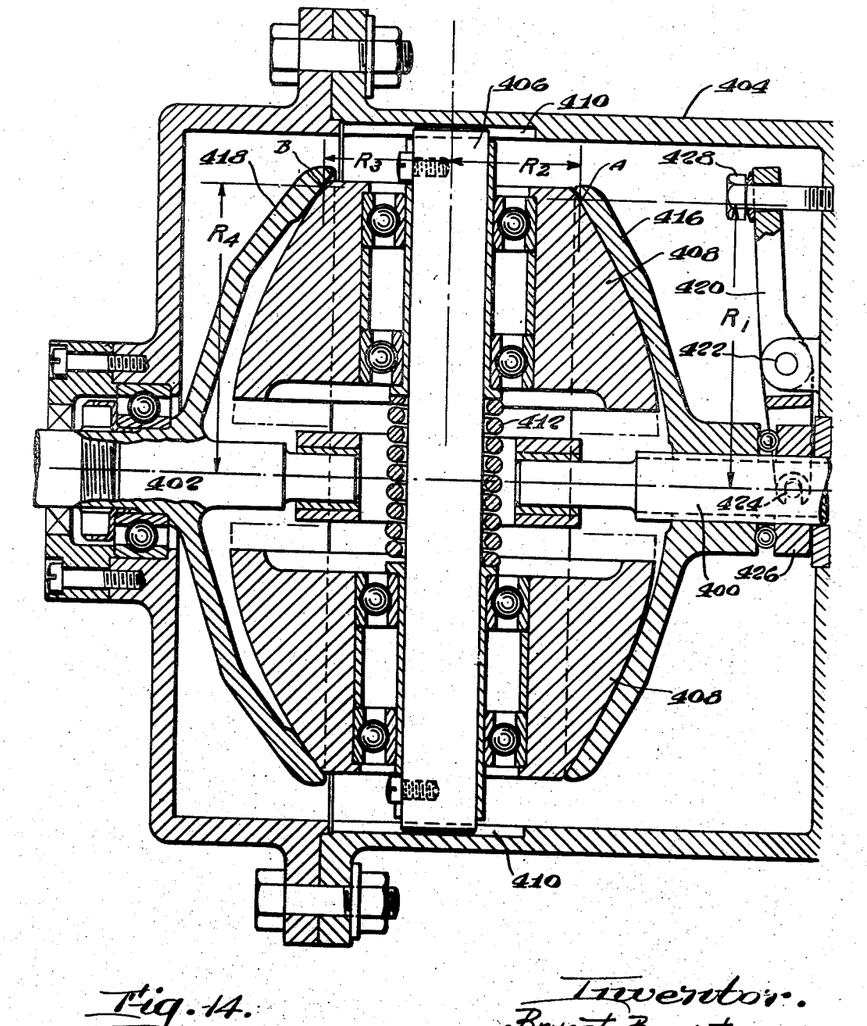
Fig. 14 is a cross sectional view of a modified form of the invention embodying a pair of rigid friction discs cooperating with radially yieldable friction rolls.

The table below indicates proportionate values in a typical unit of the above described structure.

ably supported in a housing 404. A non-rotatable carrier comprising a spindle 406 disposed between and at right angles to the shafts 400, 402 is arranged to rotatably support a pair of rollers 408 each having a tapered surface of convex curvature with the larger ends of the rollers nearest the shafts. The spindle 406 may be supported for lateral movement in grooves 410 formed in the housing 404 and the rollers 408 are arranged to be urged radially outward away from the shafts 400, 402 by a spring 412 coiled about the spindle and interposed between the ends of the rollers.

The driving shaft 400 is provided with a rigid friction disc 416 having a concave contact surface of a fixed radius of curvature slightly greater than the radius of curvature of the tapered rollers 408. The disc 416 is keyed to the driving shaft but movable axially for tangential driving engagement with one side of the rollers 408. A second rigid friction disc 418 fast on or formed integrally with the driven shaft 402 is provided with a female conical contact surface for cooperation with the other side of the tapered rollers 408. The small ends of the rollers are provided with a short conical surface of an angular pitch such that line contact is obtained with the contact surface of the driven disc 418. As herein shown, axial pressure may be applied to the driving disc 416 by a lever 420 pivotally mounted at 422 and having a yoked arm at one end slotted for engagement with pins 424 extended from a collar 426 slidingly mounted on the shaft 400 and arranged to bear against the disc 416. The other end of the lever is slotted to receive a bolt 428 adjustably received in a portion of the housing 404.

From the above description of the embodiment illustrated in Fig. 14 it will be seen that with an initial applied force against the driving disc 416 sufficient to develop the necessary tangential forces, contact will be established between the rollers 408 and the driver disc 416 at a point on the small ends of the rollers and at the extreme edge of the driver disc, as illustrated, at which time the radius R1 will be at its maximum and the radius R2 will be at its minimum. Also, tangential contact between the conically faced driven disc 418 and the rollers will be established at the small end of the rollers and the extreme radius of the driven disc, at which time the radius R4 will be at its maximum, radius R3 being constant. Thereafter, as additional pressure is applied to the driving disc 416 by adjustment of

| Radii | | | | Torque | | Tan. Force | | | R. P. M. | | |
|---|---|---|---|---|---|---|---|---|---|---|---|
| R1 | R2 | R3 | R4 | Input | Output | A | B | C | Input | Output | Roller Disc |
| ¾ | 1¼ | 1¼ | 3¼ | 1 | 4.3 | 1.33 | 1.33 | 2.66 | 1 | .23 | .6 |
| 1 | 1 | 1 | 3 | 1 | 3.0 | 1.0 | 1.0 | 2.0 | 1 | .33 | 1.0 |
| 1¼ | ¾ | ¾ | 2¾ | 1 | 2.2 | .8 | .8 | 1.6 | 1 | .45 | 1.67 |
| 1½ | ½ | ½ | 2½ | 1 | 1.7 | .67 | .67 | 1.33 | 1 | .60 | 3.0 |
| 1¾ | ¼ | ¼ | 2¼ | 1 | 1.3 | .57 | .57 | 1.14 | 1 | .78 | 7.0 |

Figure 15:
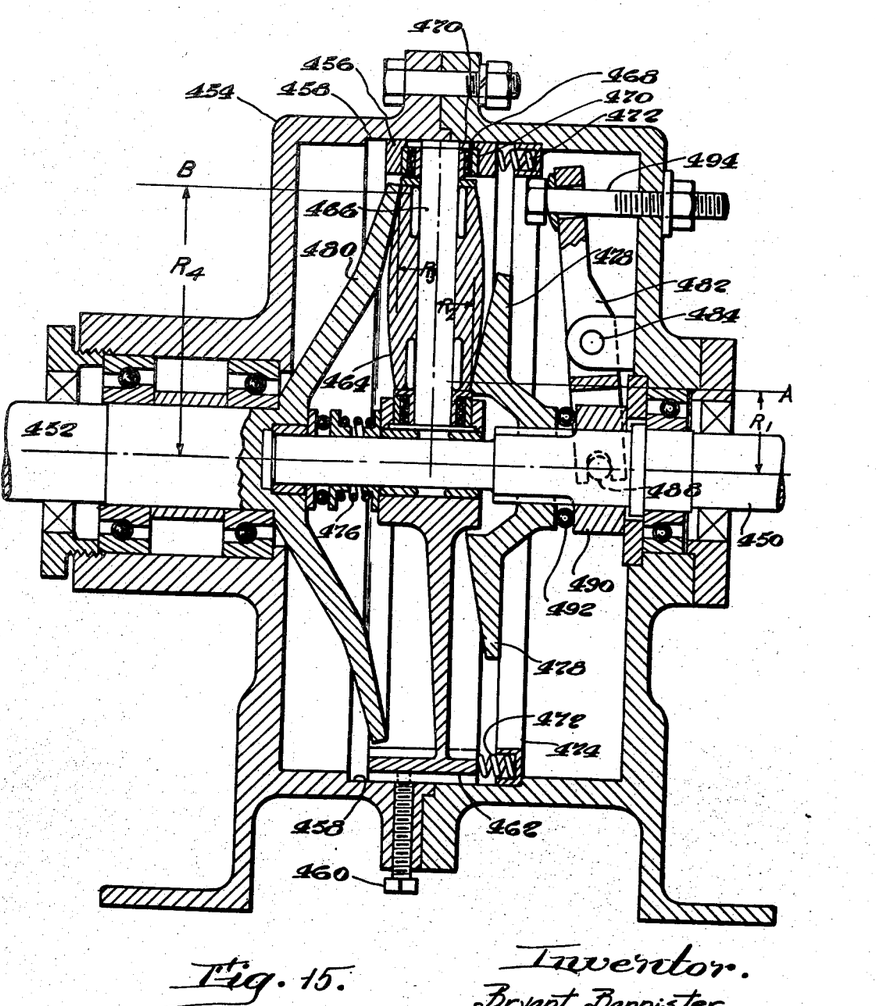
Fig. 15 is a cross sectional view of a further modification embodying rigid friction discs and a plurality of yielding mounted rollers.

The modified forms of the invention illustrated in Figs. 14 and 15 show torque conversion mechanisms embodying rigid friction discs cooperating with intermediate rollers yieldingly mounted in a manner such that when pressure is applied to the discs the rollers are caused to assume new positions and thus change the effective radii of the tangential contact points resulting in a change of speed ratio.

The form illustrated in Fig. 14 comprises a driving shaft 400 and a coaxial driven shaft 402 suitthe bolt 428, the rollers 408 will move radially toward the shafts 400, 402 against the resistance of the spring 412. The extreme position is reached when contact between the driving disc and the rollers is at the large end of the latter and the inner periphery of the driving disc at which time radius R1 is at its minimum and radius R2 is at its maximum. Radius R3 remains constant but radius R4 will decrease by the amount of roller deflection which is relatively small. An example of the variable speed ratios obtainable in the above described structure is tabulated below.

| Radii | | | | Torque | | Tan. Force | | R.P.M. | | |
|---|---|---|---|---|---|---|---|---|---|---|
| R1 | R2 | R3 | R4 | Input | Output | A | B | Input | Output | Roller |
| 3.375 | 1.5 | 1.47 | 3.44 | 1 | 1.04 | 3 | .31 | 1 | .96 | 2.25 |
| 2.5 | 1.97 | 1.47 | 3.34 | 1 | 1.8 | .4 | .54 | 1 | .56 | 1.27 |
| 1.5 | 2.31 | 1.47 | 3.22 | 1 | 3.3 | .67 | 1.05 | 1 | .30 | .65 |
| .563 | 2.50 | 1.47 | 3.13 | 1 | 9.5 | 1.8 | 3.06 | 1 | .106 | .23 |

In the above described embodiment the driven shaft 402 always rotates in the opposite direction to the driving shaft 400 and a wide range of ratios is possible varying from one to one to ten to one or more. By making the driven disc smaller than the driving disc and using a spherical contact surface on this disc, the speed ranges may be raised above a one to one ratio, varying through one to one to somewhat below.

The form illustrated in Fig. 15 comprises a driving shaft 450 and a driven shaft 452 suitably supported in coaxial alignment in a housing or casing 454. As therein shown, the end of the driving shaft 450 is reduced in diameter, extended and rotatably supported in the end of the driven shaft 452. A non-rotatable carrier 456 loosely mounted on the extended end of the driving shaft 450 is supported at its outer periphery in a grooved portion 458 of the housing and is held from rotation by a stud 460 engageable in a groove 462 cut in the carrier, the latter being free to move axially in the grooved portion 458.

A plurality of barrel shaped rollers 464 are mounted for rotation on radially arranged spindles 466 supported in the carrier 456, and, the radial shafts are provided with flexible bushings 468 interposed between metal bushings 470, as shown. Springs 472 supported at one end in an annular member 474 fixed in the housing are arranged to bear against the carrier to yieldingly urge the same in one direction, and, a spring 476 coiled about the shaft 450 and interposed between the carrier hub and the end of the driven shaft is arranged to urge the carrier in the opposite direction.

The driving shaft 450 is provided with a rigid conically faced friction disc 478 keyed thereto but free to be moved axially thereon for tangential engagement with one side of the radially arranged barrel shaped roller at their inner ends, and, a second rigid conically faced friction disc 480 is fast on or integral with the driven shaft 452 for cooperation with the other side of the rollers at their outer ends. As herein shown, pressure may be applied to the driving disc 478 to effect driving engagement of the elements by a lever 482 pivotally mounted at 484 in the housing 454. One end of the lever is provided with a yoked arm slotted for engagement with pins 488 extended from a collar 490 slidingly mounted on the shaft 450 and arranged to bear against an end thrust roller bearing indicated generally at 492 interposed between the collar 490 and the end of the driving disc hub. The other end of the lever 482 is slotted to receive a bolt 494 adjustably received in the housing 454, as illustrated.

From the above description of the embodiment of the invention illustrated in Fig. 15, it will be seen that with an initial pressure applied to the driving disc 478 sufficient to develop the necessary tangential forces, contact will be established between the driving disc and the rollers at the inner periphery of the driving disc and at the inner ends of the rollers, at which time the radii R1 and R2 are at their minimum values. At the same time, contact between the driven disc 480 and the rollers will be established at the outer periphery of the driven disc and at the outer ends of the rollers, at which time the radius R4 is at its maximum value and radius R3 is at its minimum value. As additional pressure is applied, by adjustment of the bolt 494, radii R1, R2 and R3 will increase while radius R4 will decrease, resulting in variable speed ratios as indicated in the table below.

| Radii | | | | Torque | | Tan. Force | | R.P.M. | | |
|---|---|---|---|---|---|---|---|---|---|---|
| R1 | R2 | R3 | R4 | Input | Output | A | B | Input | Output | Roller |
| .75 | .375 | .375 | 2.75 | 1 | 3.7 | 1.33 | 1.33 | 1 | .27 | 2 |
| 1.0 | .40 | .40 | 2.5 | 1 | 2.5 | 1.0 | 1.0 | 1 | .40 | 2.5 |
| 1.25 | .44 | .44 | 2.25 | 1 | 1.8 | .8 | .8 | 1 | .55 | 2.8 |
| 1.5 | .48 | .48 | 2.0 | 1 | 1.33 | .67 | .67 | 1 | .75 | 3.1 |

In the above described embodiment, the output shaft 452 rotates in the opposite direction to the input shaft 450. A limited range of ratios is obtainable but a 1:1 ratio is not possible, nor is a speed increase and decrease possible in the same range.

While the preferred embodiment of the invention and selected modifications thereof have been herein illustrated and described, it will be understood that the invention may be embodied in other forms within the scope of the following claims.

Having thus described the invention, what is claimed is:

1. In a torque converter, in combination, a driving shaft, a driven shaft, said shafts having adjacent ends in coaxial alignment with each other, a curved faced friction roller rotatably mounted on a supporting element adjacent the said ends of said shafts and at a relatively fixed radial distance from said shafts connections between said driving shaft and said friction roller for rotating the latter on its supporting element, a deflecting annular friction disc element having its axis in alignment with said shafts and shaped for tangential engagement with said friction roller, one of said elements being fixed against movement about said shaft axes and the other of said elements being fixed to said driven shaft, and means for deflecting said friction disc to change the point of tangential engagement of the same with respect to said roller whereby to vary the velocity ratio between said driving and driven shafts.

2. In a torque converter, in combination, a driving shaft, a driven shaft in coaxial alignment with the driving shaft, a carrier keyed to said driven shaft, a spherically faced friction roller rotatably mounted in said carrier on an axis spaced from and parallel to said shafts, planetary gear connections between said driving shaft and said friction roller for rotating the latter, a stationary conically shaped deflecting disc having its axis in alignment with said shafts and supported for tangential engagement with said spherically faced roller to effect rotation of said carrier and the driven shaft, and means for applying axial pressure to said conically shaped disc to deflect the same and thus vary the point of tangential engagement of said stationary disc with relation to said spherically faced friction roller whereby to change the speed ratio between said driving and driven shafts.

3. In a torque converter, in combination, a driving shaft, a driven shaft in coaxial alignment with the driving shaft, a carrier keyed to said driven shaft, a spherically faced friction roller rotatably mounted in said carrier on an axis spaced from and parallel to said shafts, planetary gear connections between said driving shaft and said friction roller for rotating the latter, a stationary conically shaped deflecting disc having its axis in alignment with said shafts and supported at its inner peripheral edge, its outer peripheral edge being free to flex for tangential engagement with said spherically faced roller at a point beyond the radius from the center of the carrier to the center of the roller to effect rotation of said carrier and the driven shaft, and means for applying axial pressure to said conically shaped disc to deflect the same and thus vary the point of tangential engagement of said stationary disc with relation to said spherically faced friction roller whereby to change the speed ratio between said driving and driven shafts.

4. In a torque converter, in combination, a driving shaft, a driven shaft in coaxial alignment with the driving shaft, a carrier keyed to said driven shaft, a spherically faced friction roller rotatably mounted in said carrier on an axis spaced from and parallel to said shafts, planetary gear connections between said driving shaft and said friction roller for rotating the latter, a stationary conically shaped deflecting disc having its axis in alignment with said shafts and supported at its outer peripheral edge, its inner peripheral edge being free to flex for tangential engagement with said spherically faced roller at a point within the radius from the center of the carrier to the center of the roller to effect rotation of said carrier and the driven shaft, and means for applying axial pressure to said conically shaped disc to deflect the same and thus vary the point of tangential engagement of said stationary disc with relation to said spherically faced friction roller whereby to change the speed ratio between said driving and driven shafts.

5. In a torque converter, in combination, a driving shaft, a driven shaft, said shafts having adjacent ends in coaxial alignment with each other, a curved faced friction roller rotatably mounted on a supporting element adjacent the said ends of said shafts and at a relatively fixed radial distance from said shafts, connections between said driving shaft and said friction roller for rotating the latter on its supporting element, a deflecting annular friction disc element having its axis in alignment with said shafts and shaped for tangential engagement with the curved face of said roller, one of said elements being fixed against movement about said shaft axes and the other of said elements being fixed to said driven shaft, and means for relatively moving said elements axially of said shafts to thereby flex said disc and change the point of tangential engagement of the same with respect to said roller.

6. In a torque converter, in combination, a driving shaft, a driven shaft, said shafts having adjacent ends in coaxial alignment with each other, a curved faced friction roller rotatably mounted on a supporting element on an axis transverse to said shafts and adjacent the said ends of said shafts and at a relatively fixed radial distance from said shafts, connections between said driving shaft and said friction roller for rotating the latter on its supporting element, a deflecting annular friction disc element having its axis in alignment with said shafts and shaped for tangential engagement with the curved face of said roller, one of said elements being fixed against movement about said shaft axes and the other of said elements being fixed to said driven shaft, and means for relatively moving said elements axially of said shafts to thereby flex said disc and change the point of tangential engagement of the same with respect to said roller.

BRYANT BANNISTER.

REFERENCES CITED

The following references are of record in the file of this patent:

UNITED STATES PATENTS

| Number | Name | Date |
| --- | --- | --- |
| 1,370,080 | Ahond | Mar. 1, 1921 |
| 1,775,201 | Jacobsen | Sept. 9, 1930 |
| 1,878,068 | Van Berkel | Sept. 20, 1932 |
| 2,299,857 | Solness | Oct. 27, 1942 |

FOREIGN PATENTS

| Number | Country | Date |
| --- | --- | --- |
| 655,109 | France | Dec. 8, 1928 |